United States Patent
Kohno et al.

(10) Patent No.: US 6,412,534 B1
(45) Date of Patent: Jul. 2, 2002

(54) PNEUMATIC RADIAL TIRES WITH SPECIFIED STEEL BELTS

(75) Inventors: Yoshihide Kohno, Kunitachi; Makoto Tsuruta; Takahiro Kimura, both of Kodaira, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/112,008

(22) Filed: Jul. 8, 1998

(30) Foreign Application Priority Data

| Jul. 9, 1997 | (JP) | 9-183600 |
| Oct. 9, 1997 | (JP) | 9-277011 |
| Jun. 15, 1998 | (JP) | 10-166854 |

(51) Int. Cl.$^7$ .............................. B60C 9/18; B60C 9/20; B60C 9/22; B60C 9/26
(52) U.S. Cl. ........................ 152/527; 152/526; 152/528; 152/531; 152/537
(58) Field of Search ................................. 152/528, 529, 152/531, 533, 527, 526, 534, 537, 175, 176

(56) References Cited

U.S. PATENT DOCUMENTS

| 3,224,482 A | * 12/1965 | Barassi et al. ............... 152/176 |
| RE26,464 E | * 9/1968 | Lugli ......................... 152/176 |
| 3,474,848 A | * 10/1969 | Maiocchi .................... 152/176 |
| 3,557,858 A | 1/1971 | Lugli et al. |
| 3,703,202 A | * 11/1972 | Maiocchi .................... 152/175 |
| 4,183,389 A | 1/1980 | Grosch |
| 5,323,828 A | 6/1994 | Kot et al. |
| 5,804,002 A | * 9/1998 | Nakano ................... 152/537 X |
| 6,082,427 A | * 7/2000 | Kohno et al. ........... 152/537 X |

FOREIGN PATENT DOCUMENTS

| EP | 0 573 237 A1 | 12/1993 |
| EP | 0 715 971 A2 | 6/1996 |
| JP | 57-201704 | 12/1982 |
| JP | 2-81705 | 3/1990 |
| JP | 2-87106 | 3/1990 |
| JP | 8-318706 | 12/1996 |

* cited by examiner

Primary Examiner—Andrienne C. Johnstone
(74) Attorney, Agent, or Firm—Sughrue Mion, PLLC

(57) ABSTRACT

A pneumatic radial tire includes a belt comprised of at least two rubberized steel wire element layers, in which the belt comprises an outermost slant element layer containing the steel wire elements obliquely arranged with respect to an equatorial plane of the tire and at least one circumferential element layer located inward from the outermost slant element layer in a radial direction of the tire and containing the steel wire elements arranged substantially in parallel to the equatorial plane, and a coating rubber for the steel wire element in the outermost slant element layer has a given modulus of elasticity at compression, and a sum of sectional area of the steel wire elements in the circumferential element layer per unit length is larger than a sum of sectional area of the steel wire elements in the outermost slant element layer per the same unit length.

12 Claims, 9 Drawing Sheets

FIG_2

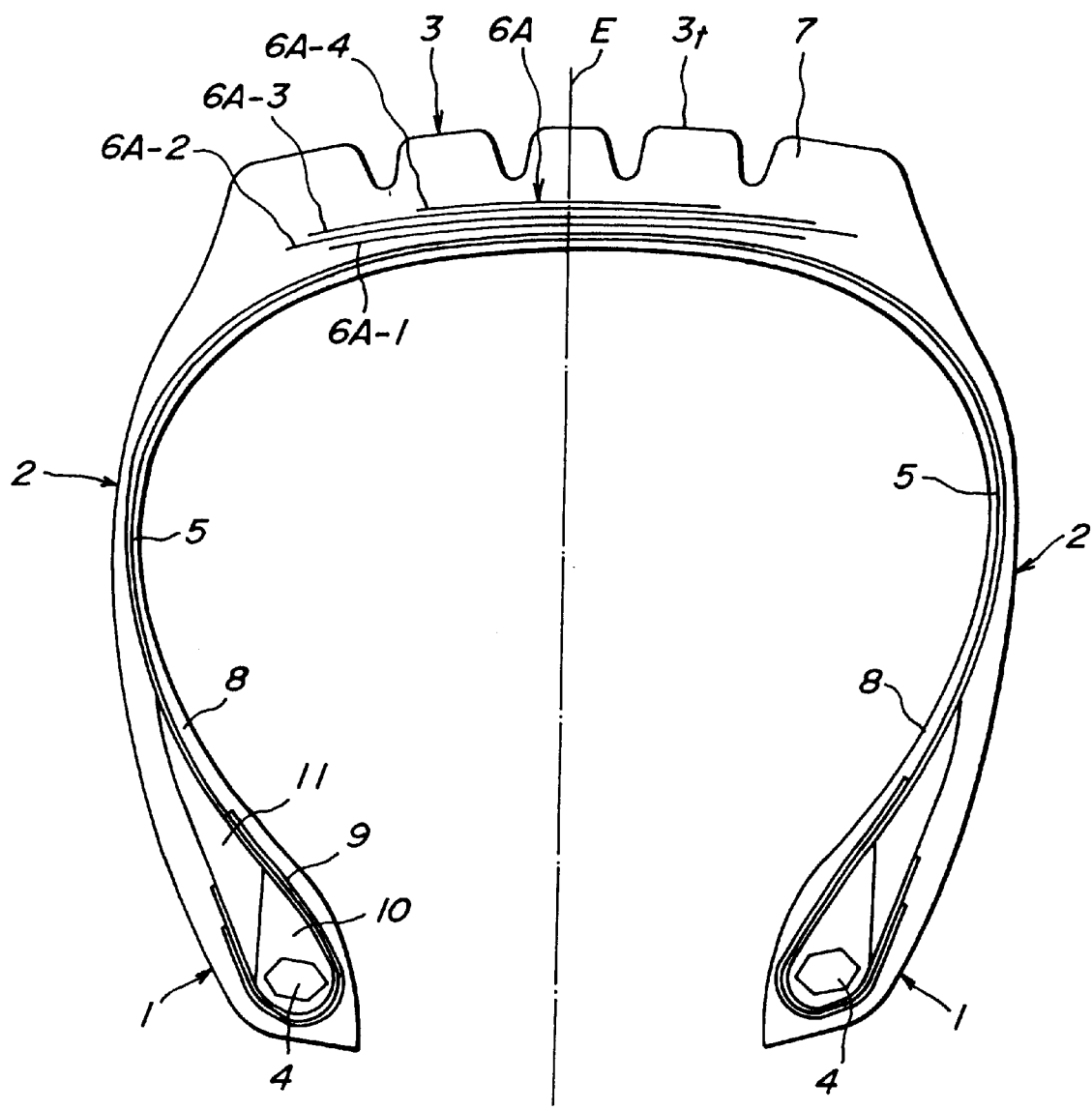
FIG_10
PRIOR ART

PNEUMATIC RADIAL TIRES WITH SPECIFIED STEEL BELTS

BACKGROUND OF THE INVENTION

1. Field of the Invention

This invention relates to pneumatic redial tires, and more particularly to a heavy duty pneumatic radial tire used from small-size truck to middle- to large-size vehicles such as trucks, buses and the like which improves a belt durability when being run on good roads exemplified by paved road surface or the like at a relatively higher speed and is excellent in the resistance to tire damage based on exterior input such as cut burst, shock burst or the like which is liable to be caused when being run on bad roads exemplified by non-paved road surface.

2. Description of Related Art

Recently, high-speed running and diversification for running mode progress with the advance of improving the performances of vehicles, while the lowering of deck height in the vehicles is generalized. Therefore, the service conditions for pneumatic tires used in these vehicles, particularly pneumatic radial tires used in vehicles of from small-size truck to truck and bus tend to become more severer as compared with the conventional service conditions. On the other hand, the demand for recapped tires is increasing in the middle- to large-size vehicles, and particularly tires capable of conducting the recapping several times is demanded.

Under the above situations, since belt durability in the pneumatic radial tire is particularly an important performance, not only the occurrence of separation failure from a belt end in a new tire but also the occurrence of large cracks in the belt end of a used base tire to be recapped becomes a problem. Such a lacking of belt durability is particularly serious in low-section profile tires used in low deck vehicles.

Among vehicles such as small-size truck, usual-size truck and the like, there is a dump truck mainly running on non-paved road. Further, sightseeing buses and so on are obliged to sometimes run on non-paved road apart from city buses. Although it is unavoidable that protuberant pebble stones and quarrying are scattered on the non-paved road, foreign matters such as metallic pieces having a sharp edge may be existent even on a paved road surface. Therefore, when the tire mounted on these vehicles rides on the foreign matter such as protuberant pebble stones, quarrying, metallic piece and the like, there may be caused cut damage arriving at the belt or burst failure based on the cut damage, or there may be caused shock burst prior to the cut damage.

It need scarcely be said that the structure of the belt is deeply concerned in the aforementioned problems on the belt durability and on the cut burst or shock burst. In general, the conventional belt has a structure shown by symbol 6A in FIG. 10. The belt 6A is comprised of four steel cord layers 6A-1 to 6A-4, in which at least two adjacent layers are cross cord layers, cords of which layers being crossed with each other with respect to an equatorial plane E of the tire.

In the belt 6A of the conventional tire, an inclination angle of steel cord with respect to the equatorial plane E is 50–70° in an innermost layer 6A-1 and 15–25° in middle layers 6A-2, 6A-3, and that of an outermost layer 6A-4 is the same as in the middle layer 6A-3. The middle layers 6A-2, 6A-3 are cross cord layers, and the outermost layer 6A-4 has the same cord inclining direction as the middle layer 6A-3 and serves as a protection layer to external wound. In the tire having such a belt 6A, however, interlaminar shearing strain in end portions of the middle layers 6A-2 and 6A-3 having a large cord crossing angle is remarkably large during running under loading and interlaminar separation failure based thereon is liable to be caused and also durability to heat generation is lacking, so that the outermost layer 6A-4 does not sufficiently play a role as the protection layer. Also, this tire has a problem that cut burst failure or shock burst failure is substantially defenseless. These problems are serious in low-section profile tires having a small aspect ratio.

In order to solve the above problems, JP-A-57-201704 proposes a heavy duty pneumatic radial tire used under a higher internal pressure in which at least two circumferential cord layers are disposed on an outer circumference of a carcass and two or more cross cord layers are disposed on a circumference thereof, and cords of the circumferential cord layer have a relative elongation before fracture of at least 8% and a heat shrinkage of at least 1.25% prior to the inflation of air pressure, and cords of each of the cross cord layers have an inclination angle of 45–90° with respect to the equatorial plane of the tire and are extensible and heat shrinkable, and JP-A-2-81706 proposes a heavy duty pneumatic tire in which a belt is comprised of a first strip disposed on an outer circumference of a carcass and containing wavy or zigzag reinforcing elements arranged along the equatorial plane, and a second strip of at least two layers, cords of which layers being crossed with each other at an inclination angle of 30–60° with respect to the equatorial plane.

However, the tires disclosed in these publications generate a large shearing strain in end portions of the cross cord layers during the running under loading because the belt is provided with the adjoining laminated cross cord layers, cords of which layers being crossed with each other with respect to the equatorial plane. As a result, the interlaminar separation failure is liable to be caused in the end portions of the cross cord layers, so that the belt structure disclosed in these publications is naturally critical in the improvement of the belt durability and hence the anticipated belt durability can not be obtained. In the tire of JP-A-57-201704, organic fiber cords are used as a reinforcing element for the belt, so that there is also a problem that the resistance to cut burst or shock burst is lacking.

In relation to the problem on the separation at the end portions of the cross cord layers as mentioned above, JP-A-2-81705 proposes a belt structure comprised of a first strip containing wavy or zigzag reinforcing elements arranged along the equatorial plane of the tire, and a second strip of a single layer containing cords arranged at an inclination angle of 15–70° with respect to the equatorial plane. JP-A-8-318706 proposes a belt structure comprised of a single slant belt layer disposed on an outer circumference of a carcass and containing a plurality of cords or filaments inclined with respect to the equatorial plane, and at least one circumferential belt layer disposed at an outside of the slant belt layer and containing a plurality of organic fiber cords arranged in parallel to the equatorial plane.

The tires having the belt structure disclosed in the latter two publications are concerned with a pneumatic radial tire for passenger car and are designed to establish the reduction of weight and cost and the improvement of performances for passenger tire such as cornering property, durability, high-speed durability and the like. They do not have cross cord layers, so that there is not an anxiety of causing the separation at the end portions of the cross cord layers. However, they are not used at a considerably high air pressure under a large load such as heavy duty pneumatic radial tire of the invention here, so that they have no concern with the improvement of performances in the heavy duty pneumatic radial tire such as belt durability, resistance to cut burst, resistance to shock burst and the like.

SUMMARY OF THE INVENTION

It is, therefore, an object of the invention to provide heavy duty pneumatic tires having mainly an aspect ratio of not more than 75% which have a sufficient resistance to belt separation in a new tire and improve a durability of belt end, which is unacceptable in repetitive recapping after use, to provide a belt durability sufficiently durable to reuse as a recap tire, and have excellent resistances to cut burst and shock burst and are capable of largely prolonging total service life of the tire.

According to the invention, there is the provision of a pneumatic radial tire comprising a pair of bead portions, a pair of sidewall portions, a tread portion extending between both sidewall portions, a carcass of one or more rubberized cord plies of radial cord arrangement extending between a pair of bead cores embedded in the bead portions to reinforce the bead portions, sidewall portions and tread portion, and a belt reinforcing the tread portion on an outer circumference of the carcass and comprised of at least two rubberized steel wire element layers, in which an outermost belt layer is an outermost slant element layer containing the steel wire elements obliquely arranged with respect to an equatorial plane of the tire; at least one belt layer of the belt located inward from the outermost slant element layer in a radial direction of the tire is a circumferential element layer containing the steel wire elements arranged substantially in parallel to the equatorial plane; a coating rubber for the steel wire element in the outermost slant element layer has a modulus of elasticity at compression of not less than 200 kgf/cm$^2$; and a sum of the cross sectional area of the steel wire elements in the circumferential element layer per unit length in a direction of extending the steel wire element in each of the belt layers is larger than a sum of the cross sectional area of the steel wire elements in the outermost slant element layer per the same unit length.

In each belt layer of the belt, many steel wire elements are embedded in rubber. The term "steel wire element" used herein includes a steel cord obtained by twisting plural steel filaments and a bundle of one or more steel filaments without twisting.

The modulus of elasticity at compression is calculated from a load L and a displacement when a vulcanized rubber piece 21 to be tested is fully filled in a steel jig 20 having a right cylindrical cavity of 14 mm in inner diameter d and 28 mm in height h as shown in FIGS. 6 and 7 and the jig 20 is set on a compression testing device 22 and a load L is applied onto upper and lower faces of the vulcanized rubber piece 21 at a rate of 0.6 mm/min, during which a displacement of the vulcanized rubber piece 21 is measured by means of a laser displacement meter 23, and is a value at a compression ratio of 0.5%. Moreover, a testing temperature is 25° C.

The term "sum of the cross sectional area of steel wire elements in a direction of extending the steel wire element in each belt layer" used herein means a sum of the sectional area of all steel wire elements included in a unit length, e.g. 25 mm or 50 mm as measured along the belt layer in a direction perpendicular to the direction of extending the steel wire element in the belt layer, in which the outermost slant element layer indicates the sum of one layer and the circumferential element layer indicates the sum of all layers.

The measuring position is not specified, but it is a central region of the tread portion including at least an equatorial plane of the tire.

As to the sum of sectional area of steel wire elements, it is preferable that the sum of sectional area of the steel wire elements in the circumferential element layer is not less than 2 times the sum of sectional area of the steel wire elements in the outermost slant element layer.

In a preferable embodiment of the invention, the steel wire element in the circumferential element layer has an initial elongation within a range of 1–5% prior to vulcanization and indicates an initial elongation within a range of 0.2–3.0% in a product tire after vulcanization. The term "initial elongation" used herein is defined by an elongation (%) just before a gradient of a curve rapidly increases in load (horizontal axis)—elongation (vertical axis) curve of the steel wire element. And also, the initial elongation prior to vulcanization means an elongation of the steel wire element from raw material stage just before the completion of crosslinking reaction at vulcanization, and the initial elongation in the product tire means an elongation of the rubberized steel wire element taken out from the tire.

In another preferable embodiment of the invention, the circumferential element layer is comprised of steel wire elements arranged in form of a wave having an amplitude in a widthwise direction of the belt. The wave includes sinusoid, zigzag and the like and is maintained in the tire irrespectively of the wavy form.

In the other preferable embodiment of the invention, the steel wire element in the outermost slant element layer has an inclination angle of 35–55° with respect to the equatorial plane of the tire.

In the further embodiment of the invention, an inner slant element layer containing steel wire elements obliquely arranged with respect to the equatorial plane is disposed between the carcass and the innermost layer among the circumferential element layers.

The inner slant element layer is favorable to have a width exceeding a width of the circumferential element layer and also the steel wire element in the inner slant element layer is favorable to have an inclination angle of 10–70° with respect to the equatorial plane.

In view of the separation resistance, it is preferable that the steel wire element of the outermost slant element layer and the steel wire element of the inner slant element layer are crossed with each other with respect to the equatorial plane of the tire.

In the other preferable embodiment of the invention, an end portion of the inner slant element layer is folded so as to enclose all of the circumferential element layers from one of widthwise ends thereof toward the other widthwise ends to form a folded layer portion serving as the outermost slant element layer, or both end portions of the inner slant element layer are folded so as to envelop all of the circumferential element layers from both widthwise ends thereof toward the equatorial plane to form a folded layer portion serving as the outermost slant element layer.

BRIEF DESCRIPTION OF THE DRAWINGS

The invention will be described with reference to the accompanying drawings, wherein:

FIG. 10 is a diagrammatically section view of the conventional tire.

DESCRIPTION OF PREFERRED EMBODIMENTS

Figure 1:
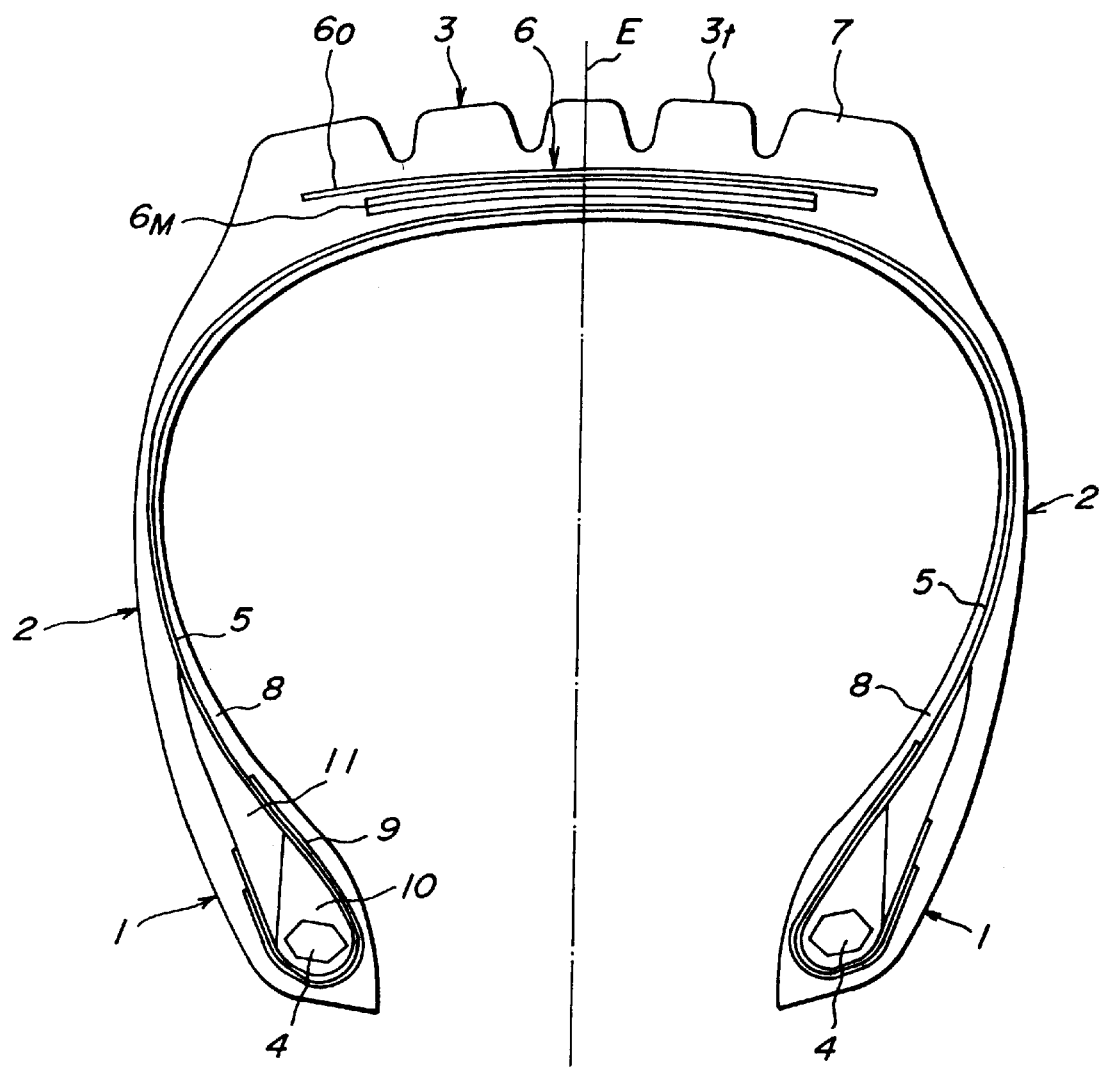
FIG. 1 is a diagrammatically section view of a first embodiment of the pneumatic tire according to the invention.

Referring to FIGS. 1–4, a heavy duty pneumatic radial tire comprises a pair of bead portions 1, a pair of sidewall portions 2, a tread portion 3 extending between the sidewall portions 2, a carcass 5 of one or more plies (one ply in the illustrated embodiments) extending between a pair of bead cores 4 embedded in the bead portions 1 to reinforce the portions 1, 2 and 3, and a belt 6 reinforcing the tread portion on the outer circumference of the carcass 5. The carcass 5 is a rubberized ply of radial cord arrangement. In case of the single ply, steel cord or an aromatic polyamide fiber cord is adaptable. The belt 6 is comprised of at least two rubberized steel wire element layers. In fact, the belt 6 is three layers in FIG. 1, four layers in FIG. 2, and substantially four layers in FIGS. 3 and 4.

Figure 2:
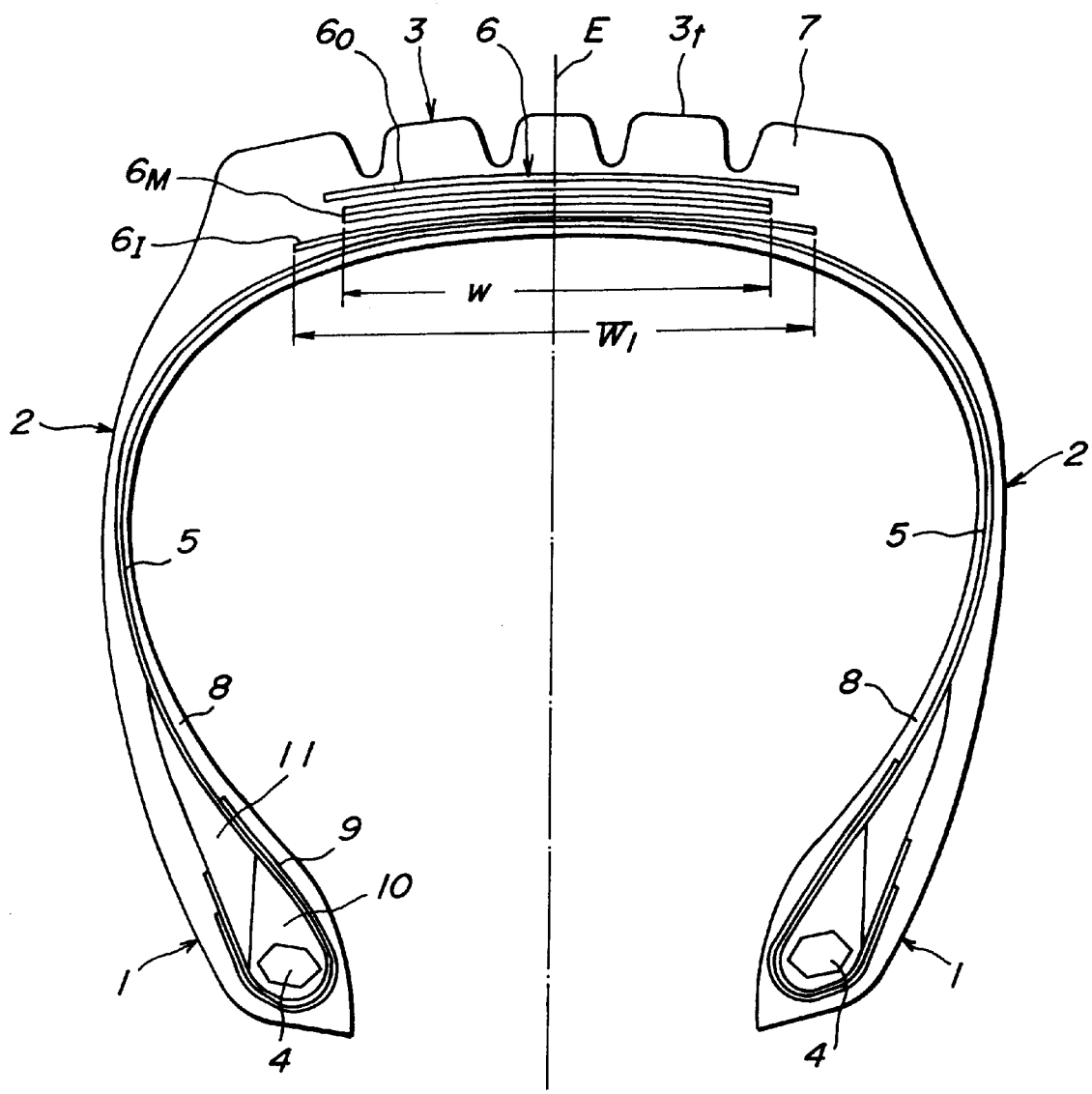
FIG. 2 is a diagrammatically section view of a second embodiment of the pneumatic tire according to the invention.

In FIGS. 1 and 2, an outermost layer $6_o$ of the belt 6 in a radial direction of the tire is an outermost slant element layer containing steel wire elements obliquely arranged with respect to an equatorial plane E of the tire. In the belt 6, at least one layer (two layers in the illustrated embodiments) located inward from the outermost slant element layer $6_o$ in the radial direction of the tire is an element layer $6_M$ in a circumferential direction of the tread portion 3 (ground contact zone 6t) in which the steel wire elements are arranged substantially in parallel to the equatorial plane E. The steel wire element constituting the skeleton of each of the layers $6_o$, $6_M$ in the belt 6 is a bundle of one or more steel filaments without twisting, or a steel cord obtained by twisting plural steel filaments. Each of the layers $6_o$, $6_M$ contains many steel wire elements therein.

In this case, a coating rubber for the steel wire element in the outermost slant element layer $6_o$ is required to have a modulus of elasticity at compression of not less than 200 kgf/cm² as previously mentioned. The modulus of elasticity at compression is obtained by the measuring method as mentioned above.

Further, it is required that the sum of the cross sectional area of steel wire elements in the circumferential element layer $6_M$ per unit length, e.g. 25 mm or 50 mm as measured in a direction of extending the steel wire element in each of the layers $6_o$, $6_M$ is larger than the sum of the cross sectional area of steel wire elements in the outermost slant element layer $6_o$ in at least a central region of the tread portion 3 (region corresponding to 2 times a quarter width when the ground contact zone 6t is divided into four equal parts in the widthwise direction). In this case, when the number of steel filaments constituting the steel wire element is n, a sectional area of one steel filament is a, the number of steel wire elements per unit length is Z and the number of the layers is N, the sum of the cross sectional area is calculated according to an equation of sum of sectional area=n×a×Z×N (mm²). For example, the outermost slant element layer $6_o$ is N=1, while the circumferential element layer $6_M$ is N=2 in the illustrated embodiment, or N=3 if three circumferential element layers are used.

When high air pressure is filled in the tire having the structure of the belt 6 as mentioned above, the belt 6 bears a large tension likewise the conventional tire. A greater part of the tension is born by the steel wire elements in the circumferential element layer $6_M$, while the tension bearing of the steel wire element in the outermost slant element layer $6_o$ is considerably small. And also, the adjacent cross cord layers are not existent in the belt 6, so that the tread portion 3 has not an excessive rigidity affecting to the cut damage.

On the other hand, when the tire is run on bad road exemplified by non-paved road scattered with foreign matters such as squarish pebble stones, quarrying and the like or on a paved road sometimes including foreign matter such as metallic pieces having a sharp edge under loading, even if the tire having the belt 6 rides on these foreign matter, the tire is excellent in the ability enveloping the foreign matter because the belt 6 has an appropriate rigidity and has merit that not only the shock burst but also the cut damage hardly occur. Even if the corner part of tip point of the foreign matter passes through a tread rubber 7 to arrive at the belt 6, the outermost slant element layer $6_o$ acts as a protection layer or a buffer layer because it is extremely small in the tension bearing and hence it is easily deformed to the passing of foreign matter to take room sufficiently absorbing deformation energy, and consequently cut penetration, cut burst and shock burst are effectively controlled to considerably improve both the resistance to cut burst and the resistance to shock burst.

Figure 8:
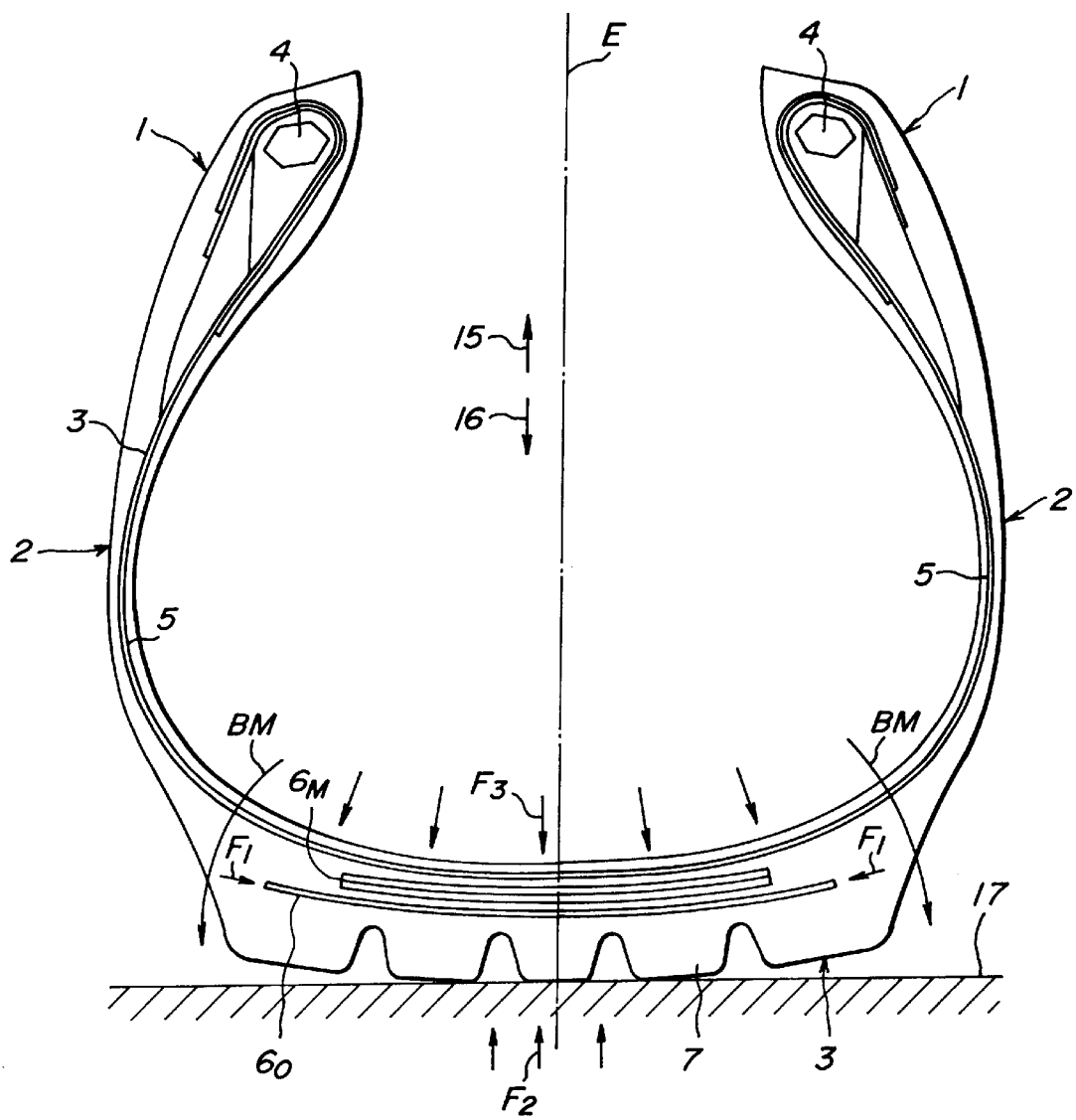
FIG. 8 is a schematic view illustrating forces applied to the belt of the tire under loading.

Referring to FIG. 8 showing a tire section just before the deformation of the tread portion 3 contacted with a road surface 17 at an inflation of a high air pressure under loading, bending deformation in an arrow direction BM is forced in the tread portion 3 by flex deformation of the sidewall portion 2, during which the outermost slant element layer $6_o$ is subjected to compression force $F_1$ directing from each side of both ends toward the equatorial plane E, compression force $F_2$ directing inward in the radial direction of the tire based on reaction force from the road surface 17 shown by an arrow 15, and compression force $F_3$ directing outward in the radial direction of the tire based on the air pressure filled in the tire shown by an arrow 16, respectively. Furthermore, the outermost slant element layer $6_o$ is forcedly deformed straightforward in the circumferential direction of the tread portion 3, which also brings about compression force in the outermost slant element layer $6_o$. That is, the outermost slant element layer $6_o$ is in a three-dimensionally compressed state.

Since the outermost slant element layer $6_o$ is obliged to be in a three-dimensionally compressed state, when the value of the modulus of elasticity at compression of the coating rubber is too small, the steel wire element can not oppose to the compression forces and finally local deformation is created to cause buckling phenomenon in the steel wire element. In running of the tire over a long distance, the above buckling phenomenon is repeated extremely many times to finally cause fatigue breakage of the steel wire element, which gives a fatal defect to the belt 6 to facilitate the occurrence of shock burst or separation failure.

However, when the modulus of elasticity at compression of the coating rubber for the outermost slant element layer $6_o$ is not less than 200 kgf/cm$^2$, the resistance to compression in the outermost slant element layer $6_o$ as a whole is considerably improved, which is possible to prevent the occurrence of the buckling phenomenon in the steel wire element to thereby improve the resistance to shock burst and separation resistance and hence the durability of the belt 6 is improved.

Since the action of the outermost slant element layer $6_o$ as a protection layer or buffer layer is naturally critical, the sum of sectional area of the steel wire elements in the circumferential element layer $6_M$ per unit length as measured along the layer is made larger than the sum of sectional area of the steel wire elements in the outermost slant element layer $6_o$ per unit length in at least a central region of the tread portion 3. Thus, it is possible to sufficiently oppose the tire to deformation energy applied from the foreign matter to the tread portion 3 and the cutting energy of the belt 6 when riding over the foreign matter as previously mentioned and hence the occurrence of shock burst and cut burst can be prevented.

Moreover, the reason why the relation in the sum of the cross sectional area of steel wire elements between the layers $6_o$ and $6_M$ is explained in at least a central region of the tread portion 3 is due to the fact that chance of cut damage and chance of riding over the foreign matter are larger in the central region than those in the other remaining region. However, it is needless to say that the whole region of the tread portion 3 has the chance of cut damage and chance of riding over the foreign matter independently of the quantity of the chance. Therefore, it is adequate that the full face of the circumferential element layer $6_M$ is covered with the outermost slant element layer $6_o$ by making the width of the outermost slant element layer $6_o$ wider than the width of the circumferential element layer $6_M$.

Since the belt 6 has no the adjacent cross cord layers, a large interlaminar shearing strain, which has been observed in the end portions of the cross cord layers, is not caused between the end portion of the outermost slant element layer $6_o$ and the end of the circumferential element layer $6_M$ during the running under loading and hence the occurrence and growth of cracks between the layers at the end of the belt 6 based on the interlaminar shearing strain are suppressed to improve the separation resistance between the layers in not only a new tire but also a recapped tire. And also, the durability to heat generation is improved by adopting the circumferential element layer $6_M$, so that the resistance to heat separation based on heat generation is also improved.

The tire having the structure of the belt 6 as mentioned above is excellent in the separation resistance and the recapping property and can develop the resistance to shock burst and resistance to cut burst during riding on the foreign matter during the running on bad road. In this case, the inclination angle of the steel wire element in the outermost slant element layer $6_o$ with respect to the equatorial plane E is effective to be within a range of 35–55° in order to cope with the shock and cut directions of the foreign matter to the tread portion 3 because the ply cord of the carcass 5 substantially crosses with the steel wire element of the circumferential element layer $6_M$.

Figure 9:
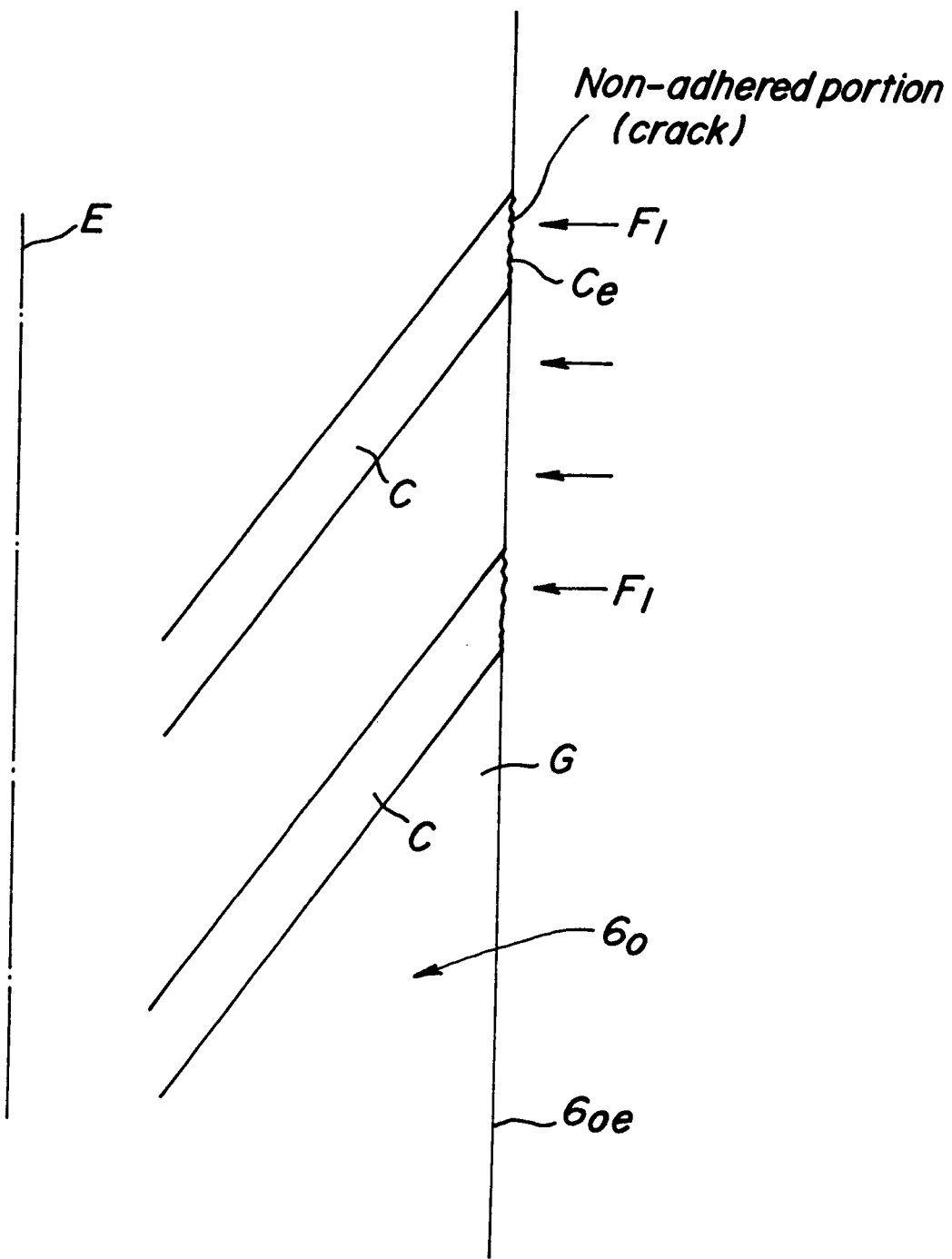
FIG. 9 is a schematic view illustrating a state of edge faces of steel wire elements in an outermost slant element layer and compression force applied to the edge face.

Also, the outermost slant element layer $6_o$ is formed by cutting an width-wide, elongated, unvulcanized steel wire element cloth coated with rubber at a given angle into cloth pieces and sticking these pieces together in the manufacture of the tire, so that steel texture itself is exposed in the edge face of the steel wire element at the cut surface. Therefore, as shown in FIG. 9, the edge face Ce of the steel wire element located at the widthwise end $6_o$e of the outermost slant element layer $6_o$ in the product fire after the vulcanization does not adhere to the coating rubber G, so that cracks are created when the tire is run over a slight distance. As the running distance of the tire becomes long, the crack gradually grows.

As previously mentioned in FIG. 8, the outermost slant element layer $6_o$ is subjected to the compression force $F_1$ directing from the sides of both widthwise ends toward the equatorial plane E during the running of the tire under loading. This compression force $F_1$ acts in a direction substantially perpendicular to the equatorial plane E as shown in FIG. 9, so that it can effectively be utilized for controlling the crack growth at the edge face Ce of the steel wire element C as far as possible. For this purpose, it is enough to include the inclination angle of the steel wire element C in the outermost slant element layer $6_o$ with respect to the equatorial plane as far as possible. The inclination angle of the steel wire element C with respect to the equatorial plane E is adaptable to be within a range of 35–55° in view of shock and cut directions of foreign matter, which is made possible to delay the growing rate of the crack at the edge face Ce of the steel wire element C to thereby avoid the occurrence of separation accompanied with the growth of the crack in the outermost slant element layer $6_o$.

In the tire of FIG. 2, the belt 6 has an inner slant element layer $6_I$ arranged between the carcass 5 and an innermost layer of the circumferential element layers $6_M$ and containing steel wire elements obliquely arranged with respect to the equatorial plane E in addition to the outermost slant element layer $6_o$. The inner slant element layer $6_I$ plays a role as mentioned below.

During running of the tire under loading, the tread portion 3 brings about the relative movement of ply cords in the carcass 5 opening, closing and restoring mutual ply cords in the circumferential direction for a distance from a stepping-in side to a kicking-out side of a ground contact region in the circumferential direction. The relative movement of these ply cords in the carcass 5 produces a force of dragging, compressing and restoring the circumferential element layer $6_M$ in the circumferential direction. This force causes shearing strain between the carcass 5 and the circumferential element layer $6_M$ and gives compression fatigue to the steel wire element in the circumferential element layer $6_M$. If the shearing strain is large, the circumferential element layer $6_M$ arrives at separation, while if the degree of compression fatigue of the circumferential element layer $6_M$ is high, there is a fear of causing the fatigue breakage of the steel wire element.

However, the relative movement of the ply cords in the carcass 5 exerting upon the circumferential element layer $6_M$ can be shut off by disposing the inner slant element layer $6_I$ between the carcass 5 and the innermost layer of the circumferential element layers $6_M$. In this case, the relative movement of the ply cords in the carcass 5 acting to the inner slant element layer $6_I$ is sufficiently absorbed by the change of the inclination angle of the plural steel wire elements arranged in the inner slant element layer $6_I$. As a result, troubles such as separation failure of the circumferential element layer $6_M$ and fatigue breakage of the steel wire element in the circumferential element layer $6_M$ are completely prevented without causing inconveniences between the inner slant element layer $6_I$ and the carcass 5.

In order to further enhance the above effect, it is effective to make the width $W_1$ of the inner slant element layer $6_I$ wider than the width w of the circumferential element layer $6_M$, and the inclination angle of the steel wire element in the inner slant element layer $6_I$ with respect to the equatorial plane E is within a range of 10–70°, preferably 30–70°. Moreover, the inclination direction of the steel wire element in the inner slant element layer $6_I$ with respect to the equatorial plane E is not restricted. In general, the rigidity of the belt 6 should be made large as far as possible by crossing the steel wire elements of the inner slant element layer $6_I$ with the steel wire elements of the outermost slant element layer $6_o$ with respect to the equatorial plane E. In case of requiring to control the rigidity of the belt 6 to a small level to further improve the cut resistance, the inclination direction of the steel wire element in the inner slant element layer $6_I$ is the same as that in the outermost slant element layer $6_o$.

In the invention, it is favorable that the sum of the cross sectional area of steel wire elements in the circumferential element layer $6_M$ is not less than 2 times the sum of the cross sectional area of steel wire elements in the outermost slant element layer $6_o$. This means that the resistance to shock burst and resistance to cut burst in the tire are more ensured by providing an ability of sufficiently meeting with the deformation energy applied to the tread portion 3 and the cutting energy of the belt 6 from the foreign matter to the belt 6.

Also, it is favorable that each of the steel wire elements embedded in the circumferential element layer $6_M$ has an initial elongation of 1–5% prior to vulcanization and an initial elongation of 0.2–3.0% in a product tire after the vulcanization, which are high in the ability of absorbing energy of concentrated shock input and cut input in the riding of the tire on the foreign matters during running under loading and to considerably contribute to develop excellent resistance to shock burst and resistance to cut burst. The measurement and set of the above initial elongation are as previously mentioned.

The reason why the steel wire element is required to have an initial elongation of 0.2–3.0% in a product tire is due to the fact that tension is adequately born by the circumferential element layer $6_M$. When the initial elongation is less than 0.2%, the tension bearing of the circumferential element layer $6_M$ is too large and the circumferential rigidity of the circumferential element layer $6_M$ becomes large. Hence the deformation energy of the tread portion 3 in the riding of the tire on the foreign matter can not sufficiently be absorbed and the desired resistance to shock burst and resistance to cut burst can not be obtained. When the initial elongation exceeds 3%, the tension bearing of the circumferential element layer $6_M$ is too small and the tension bearing of the outermost slant element layer $6_o$ increases and the rigidity of the outermost slant element layer $6_o$ becomes large and hence the function of the outermost slant element layer $6_o$ as a protection layer or buffer layer lowers and the resistance to shock burst and resistance to cut burst lower.

The reason why the steel wire element is required to have an initial elongation of 1–5% prior to the vulcanization is due to the fact that the steel wire element is necessary to have the initial elongation larger than the initial elongation in the product tire because in the vulcanization of an unvulcanized tire, rubber penetrates into spaces between the steel wire elements and the crosslinking reaction of the rubber is completed at a state of somewhat stretching the steel wire elements by the application of a high pressure to an inner surface of the unvulcanized tire.

As means for providing the above initial elongation to each of the steel wire elements in the circumferential element layer $6_M$, there are a first case of using a steel cord obtained by twisting plural steel filaments at an adjusted twisting number or twisting pitch, and a second case of using a wavy steel wire element as one steel wire element or a bundle of plural steel wire elements. The selection from the first and second cases may be decided by considering the service conditions of the tire, cost and the like. The following is described with respect to the wavy steel wire element.

Figure 5:
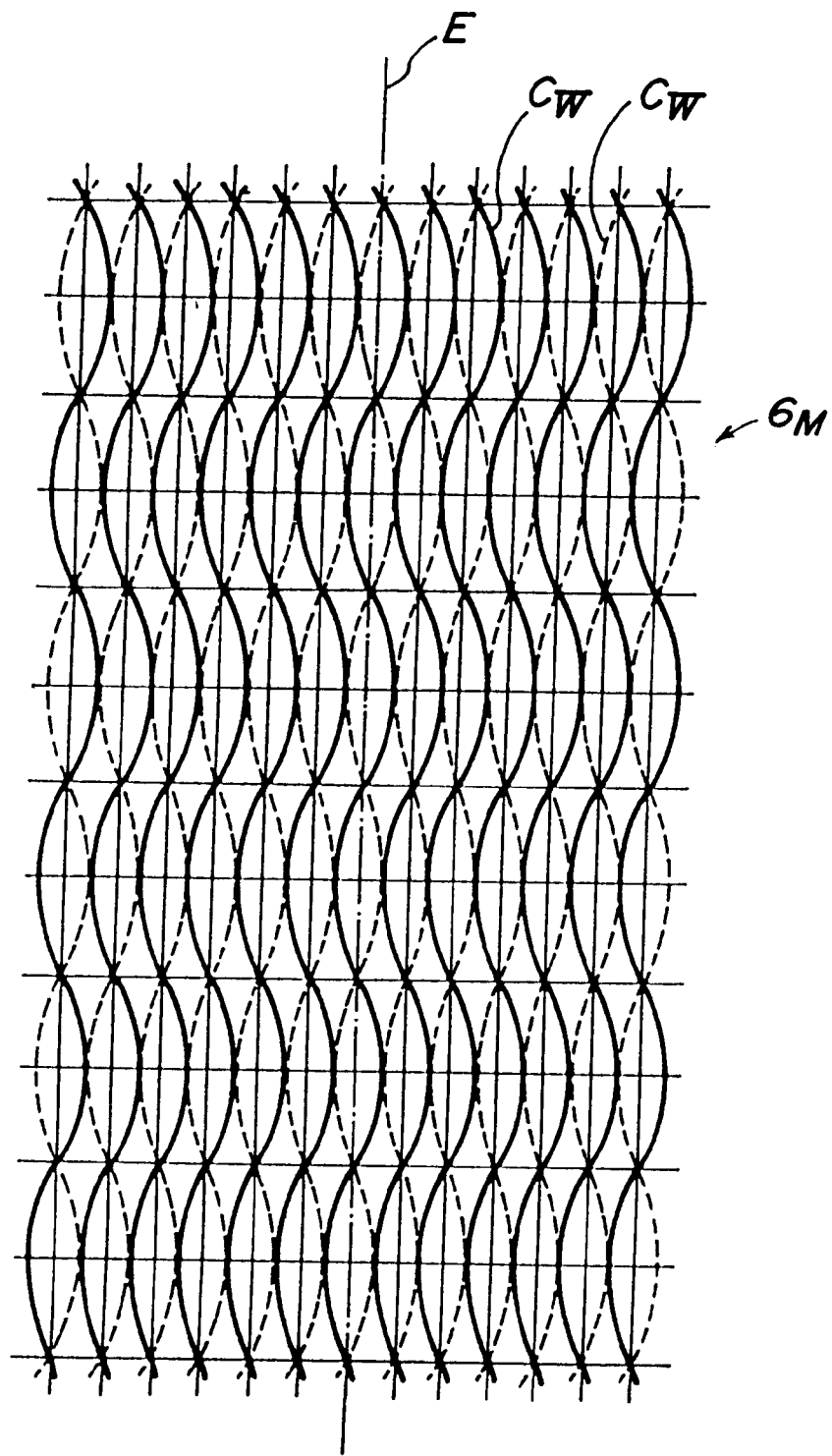
FIG. 5 is a partially developed perspective plan view illustrating an embodiment of the steel wire element layer containing many wavy steel wire elements to be used in the tire according to the invention.
Figure 6:
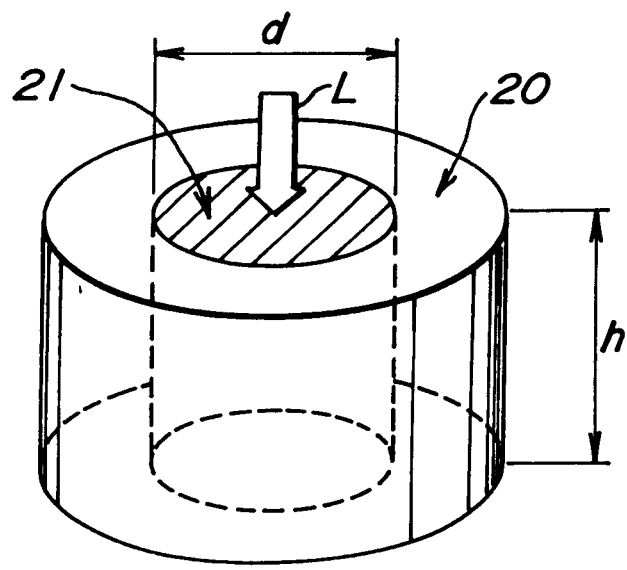
FIG. 6 is a perspective view illustrating a test piece and a jig housing it for the measurement of modulus of elasticity at compression of rubber.
Figure 7:
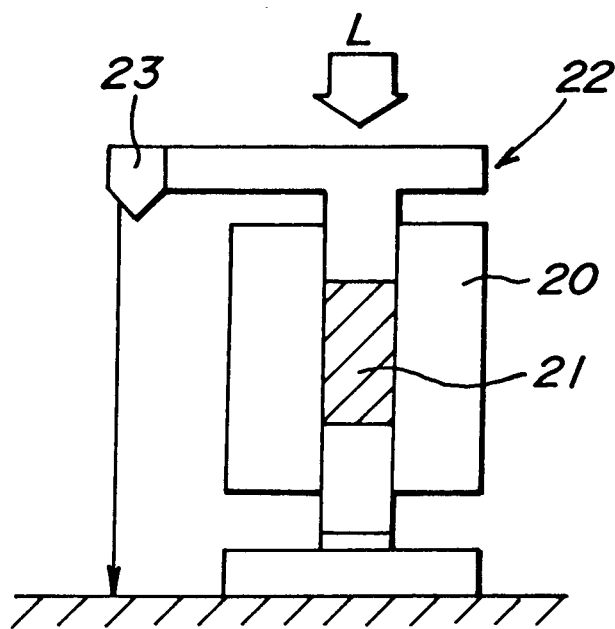
FIG. 7 is a side view of a testing device for the measurement of modulus of elasticity at compression of rubber.

The wavy steel wire element indicates a steel filament CW, a bundle CW of two or more steel filaments or a steel cord CW formed into a wave form in the tire as shown in FIG. 5. It is favorable that many wavy steel wire elements CW are arranged side by side in the adjoining laminated circumferential element layers $6_M$ in the widthwise direction of the belt 6 so as to extend in the circumferential direction of the tread portion 3 or ground contact region 3t and align mountains and valleys of the element to each other in each of the layers but shift phases of wave between the layers to each other by about 180° or alternately form a bulging portion and an intersect portion between the layers as shown in FIG. 5. The same procedure is applied to three or more circumferential element layers $6_M$. The wavy steel wire element CW shown in FIG. 5 indicates a sinusoid, but it may be zigzag. Moreover, fine lines horizontally and vertically shown in FIG. 5 are lines for merely explaining the arrangement of the wavy steel wire elements in the circumferential element layers and are not existent in the actual tire.

Figure 3:
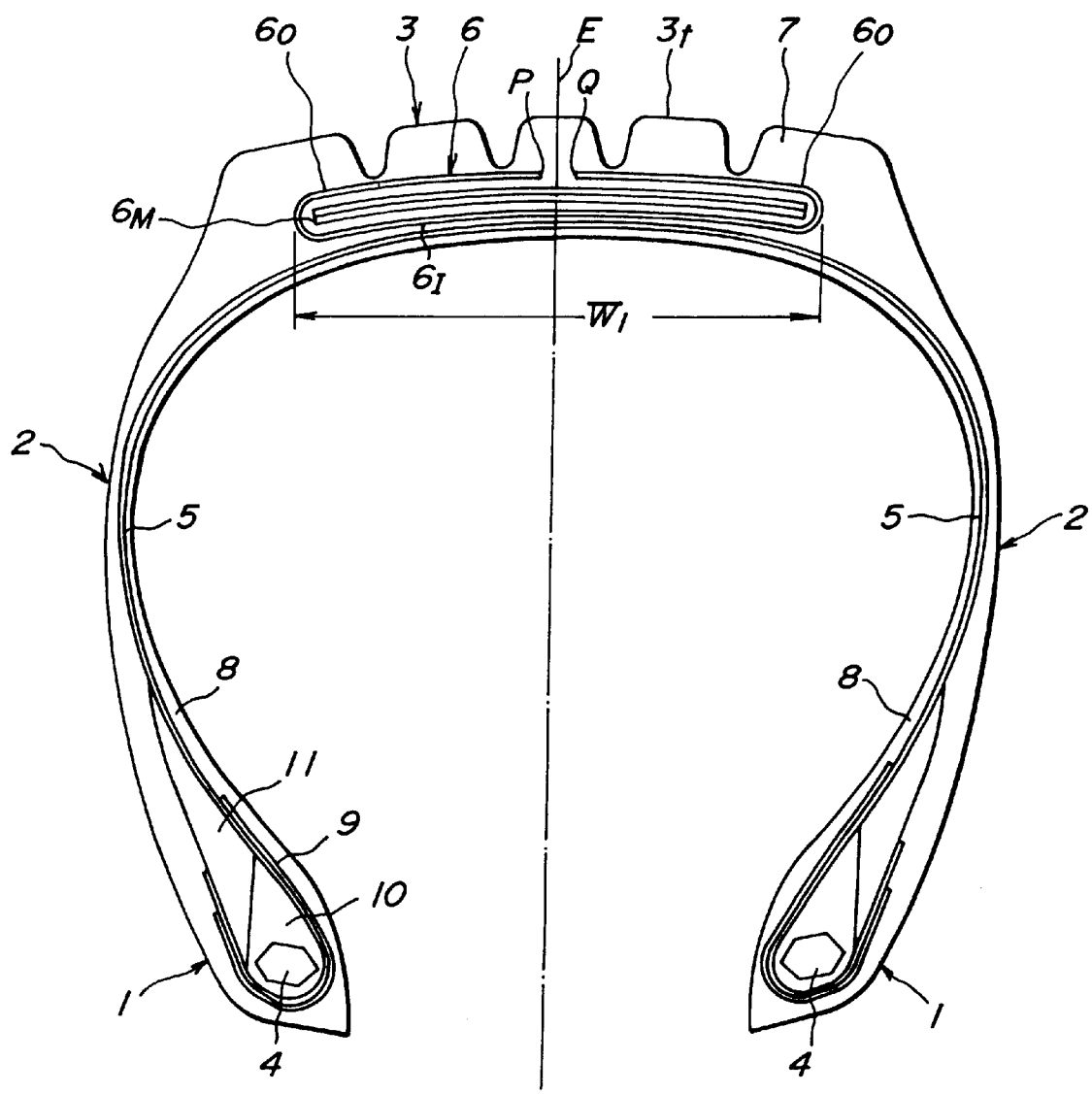
FIG. 3 is a diagrammatically section view of a third embodiment of the pneumatic tire according to the invention.
Figure 4:
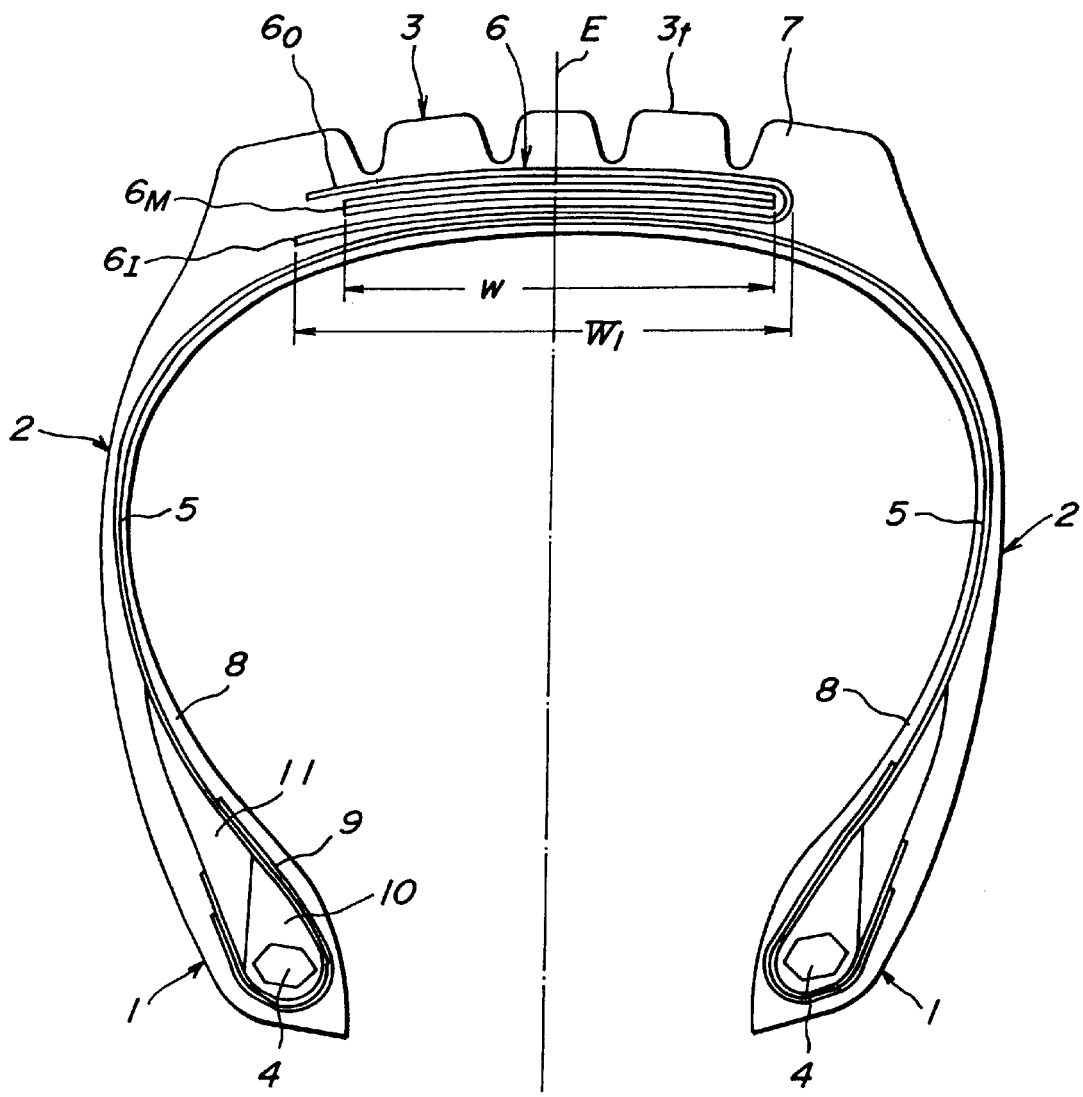
FIG. 4 is a diagrammatically section view of a fourth embodiment of the pneumatic tire according to the invention.

The belts 6 shown in FIGS. 3 and 4 are modifications of the belt 6 shown in FIG. 2, respectively. In this case, there is used a width-wide inner slant element layer $6_I$ having a width largely wider than the width W1 of the inner slant element layer $6_I$ shown in FIG. 2 and the same inclination angle range of the steel wire element with respect to the equatorial plane E as in FIG. 2.

In FIG. 3, the width-wide slant element layer $6_I$ has a folded layer portion $6_o$ enveloping all of the circumferential element layers $6_M$ from sides of both widthwise ends toward the equatorial plane E. The opposed ends P, Q of the folded layer portion $6_o$ with each other or separated apart from each other by a slight distance, but the overlapping of the ends P, Q is undesirable. In FIG. 4, the width-wide slant element layer $6_I$ has a folded layer portion $6_o$ enveloping all of the circumferential element layers $6_M$ from widthwise ends thereof (right end in FIG. 4) toward the other widthwise ends (left end in FIG. 4).

The width W1 of the width-wide inner slant element layer $6_I$ shown in FIG. 3 is a distance between both folded ends and that shown in FIG. 4 is a distance between a free end and the folded end. The folded layer portion $6_o$ shown in FIGS. 3 and 4 has the same function as the outermost slant element layer $6_o$ shown in FIGS. 1 and 2 and develops the same effects as in FIGS. 1 and 2. The circumferential element layers $6_M$ shown in FIGS. 1 and 2 are applied to the cases shown in FIGS. 3 and 4.

As a result of the outward folding of the width-wide inner slant element layer shown in FIGS. 3 and 4, the inclination direction of the steel wire element in the folded layer portion as the outermost slant element layer $6_o$ with respect to the equatorial plane E is opposite to the inclination direction of the steel wire element in the width-wide inner slant element layer $6_I$.

In the embodiments of FIGS. 2 and 4, there is a sufficient space between the end portion of the inner slant element layer $6_I$ and the end portion of the outermost slant element layer $6_o$, so that when a space rubber (not shown) is disposed in this space, the interlaminar shearing stress is largely mitigated and hence there is no trouble of causing separation between these end portions.

Moreover, the tires shown in FIGS. 1–4 are tubeless tires, which have an innerliner 8 made from an air impermeable rubber. In these figures, numeral 9 is a reinforcing cord layer for the bead portion 1, numeral 10 a hard rubber stiffener, and numeral 11 a soft rubber stiffener.

The following examples are given in illustration of the invention and are not intended as limitations thereof.

[First Embodiment]

There are provided five radial-ply tubeless tires for truck and bus having a tire size of 11R22.5, in which a carcass 5 is a single rubberized ply of radial steel cord arrangement and a belt 6 has a structure as shown in FIG. 1. That is, the belt 6 of Examples 1–4 comprises four circumferential element layers $6_M$ and one outermost slant element layer $6_o$, while the belt 6 of Example 5 comprises two circumferential element layers $6_M$ and one outermost slant element layer $6_o$.

In each of the circumferential element layers $6_M$ of Examples 1–4 is used a wavy steel cord CW as shown in FIG. 5 having a twisting structure of 3×0.19+9×0.19, a wavelength of 36 mm and an amplitude of 1 mm. An end count of the layer $6_M$ is 25 cords/50 mm. In each of the circumferential element layers $6_M$ of Example 5 a straight, high-extensible steel cord having an initial elongation of 2.0% and a twisting structure of 4×4×0.23. An end count of the layer $6_M$ is 20 cords/50 mm is used. Moreover, an inclination angle of the cord in the circumferential element layers $6_M$ in Examples 1–5 is approximately 0° with respect to the equatorial plane E.

In the outermost slant element layer $6_o$ of Examples 1–5 is used a usual straight steel cord having a twisting structure of 1×0.34+6×0.34, in which an end count is 24 cords/50 mm.

In order to confirm the effect of the tire in the Examples, there are provided tires of Conventional Example 1 and Comparative Examples 1 and 2 each having a belt comprised of five layers.

In the belt of Conventional Example 1, the same material as the outermost slant element layer $6_o$ of Examples 1–5 is applied to three layers and the remaining third and fourth layers viewed from the outside of the belt are cross cord layers. In the belt of Comparative Examples 1 and 2, the same wavy steel cord CW of Examples 1–4 is applied to four layers viewed from the side of the carcass 5, in which the inclination angle of the cord is approximately 0° and the end count is 10 cords/50 mm, and the same material as in the outermost slant element layer $6_o$ of Examples 1–5 is applied to the remaining outermost layer.

As to the structure of the belt 6 in Examples 1–5, Conventional Example 1, and Comparative Examples 1 and 2, inclination direction (R=upward to the right, L=upward to the left) and inclination angle (inclination angle of three slant element layers in Conventional Example 1) of the steel wire element in the outermost slant element layer $6_o$, modulus of elasticity at compression (kgf/cm²) of coating rubber therefor and ratio of sum of sectional area of steel wire elements in the circumferential element layer $6_M$ per 50 mm to sum of sectional area of steel wire element in the outermost slant element layer $6_o$ per 50 mm in each of Examples 1–5 and Comparative Examples 1–2 other than the conventional example (shown as value of ratio R) are shown in Table 1.

TABLE 1

|  | Conventional Example 1 | Comparative Example 1 | Comparative Example 2 | Example 1 | Example 2 | Example 3 | Example 4 | Example 5 |
|---|---|---|---|---|---|---|---|---|
| Inclination direction-angle (° C.) | — | R45 | R45 | R60 | R30 | R45 | R52 | R45 |
| Value of ratio R | — | 0.89 | 2.21 | 2.21 | 2.21 | 2.21 | 2.21 | 1.73 |
| Modulus of elasticity at compression (kgf/cm²) | 170 | 250 | 170 | 250 | 250 | 250 | 250 | 250 |
| Test A  belt durability | 100 | 135 | 120 | 101 | 148 | 140 | 145 | 140 |
| cord breakage | none | none | presence | none | none | none | none | none |
| Test B  belt durability | 100 | 80 | 135 | 105 | 115 | 135 | 127 | 128 |

[Second Embodiment]

There are provided three radial-ply tubeless tires for truck and bus having a tire size of 285/60R22.5, in which a carcass 5 is a single rubberized ply of radial steel cord arrangement and a belt 6 has a structure of FIG. 2 in Example 6, a structure of FIG. 3 in Example 7 and a structure of FIG. 4 in Example 8. In Examples 6–8, the width w of the circumferential element layer $6_M$ is 180 mm, and the width W1 of the inner slant element layer $6_I$ is 240 mm. Moreover, opposed ends P, Q of the folded layer portions as the outermost slant element layer $6_o$ in Example 7 with each other.

In the circumferential element layer $6_M$ of Examples 6–8 a bundle CW of 12 wavy steel filaments as shown in FIG. 5 having a wavelength of 36 mm and an amplitude of 1 mm, in which an end count is 25 bundles/50 mm and an inclination angle of the wavy steel filament bundle CW is approximately 0° with respect to the equatorial plane E is used.

In the outermost slant element layer $6_o$ of Example 6 usual straight steel cord having a twisting structure of 1×0.36+6×0.36, in which an end count is 24 cords/50 mm is used.

In the inner slant element layer $6_I$ of Examples 6–8 (folded layer portion of Examples 7–8 corresponding to the outermost slant element layer $6_o$) a usual straight steel cord having a twisting structure of 1×0.36+6×0.36, in which an end count is 24 cords/50 mm is used.

In order to evaluate the belt durability in the tires of Examples 6–8, there are provided a tire shown in FIG. 10 as Conventional Example 2 and a tire of Comparative Example 3.

In the tire of Conventional Example 2, the belt 6A is comprised of an innermost layer 6A-1 having a width of 180 mm, middle layers 6A-2, 6A-3 having widths of 245 mm and 225 mm, respectively, and an outermost layer 6A-4 having a width of 150 mm. And also, inclination direction (R, L) and inclination angle of the steel cord in each layer of the belt 6A with respect to the equatorial plane E are R52° in the layer 6A-1 and R18° in the layer 6A-2 and L18° in the layer 6A-3, which the layers 6A-2, 6A-3 form cross cord layers, and the layer 6A-4 has the same inclination direction and inclination angle as the layer 6A-3.

In the tire of Comparative Example 3, the belt 6 is comprised of four layers, each using the same wavy steel filament bundle arranged in the direction of the ground contact region as in Examples 6–8.

Table 2 illustrates the inclination direction and inclination angle of the steel wire element and modulus of elasticity at compression of coating rubber therefor and value of ratio R in Examples 6–8, Conventional Example 2 and Comparative Example 3 likewise the first embodiment.

TABLE 2

|  | Conventional | Comparative | Example | | |
|---|---|---|---|---|---|
|  | Example 2 | Example 3 | 6 | 7 | 8 |
| Inclination direction · angle (° C.) | — | — | $6_I$: R35, $6_O$: L35 | | |
| Value of ratio R | — | 2.23 | 1.12 | 1.12 | 1.12 |
| Modulus of elasticity at compression (kgf/cm²) | 170 | 250 | 250 | 250 | 250 |
| Test A | | | | | |
| belt durability | 100 | 105 | 152 | 145 | 145 |
| cord breakage | none | none | none | none | none |
| Test B | | | | | |
| belt durability | 100 | 80 | 168 | 105 | 168 |

In order to evaluate the durability of the belt 6, the following two tests are carried out with respect to the tires of Examples 1–8, Conventional examples 1–2 and Comparative examples 1–3.

(1) Test A: long-run test for evaluating belt durability inclusive of recapping property Each tire of Examples 1–5, Conventional Example 1 and Comparative Examples 1–2 is inflated under a maximum air pressure of 7.0 kgf/cm² and a load of 4100 kgf corresponding to about 1.5 times a maximum load capacity of 2725 kg is applied thereto.

Each tire of Examples 6–8, Conventional Example 2 and Comparative Example 3 is inflated under a maximum air pressure of 9.0 kgf/cm² and a load of 4725 kgf corresponding to about 1.5 times a maximum load capacity of 3150 kg is applied thereto.

Each of these tires is continuously run on a drum of 1.5 m in diameter rotating at a speed of 65 km/h until the trouble is caused in the belt. The belt durability is evaluated by measuring a running distance in the occurrence of the trouble and represented by an index on the basis that the conventional tire is 100. The larger the index value, the better the belt durability.

Then, the tire is cut to measure the presence or absence of breakage in the steel cord C of the outer most slant element layer $6_o$. The belt durability and the cord breakage are shown in Tables 1 and 2, respectively.

Moreover, the maximum air pressure and maximum loading capacity of the tire are according to TRA YEAR BOOK (1998) or ETRTO STANDARDS MANUAL (1998).

(2) Test B:

This test is a so-called plunger test for evaluating a resistance to shock burst or cut burst in the riding on foreign matter (resistance to shock burst, resistance to cut burst) and is carried out according to a tire strength (breakage energy) test defined in JIS D4230 (1986) in which pushing force just before the breakage of the tire (or just before the arrival of the plunger at the rim) and moving quantity of the plunger to the tire are measured to calculate breakage energy from the measured values. The belt durability in the riding on foreign matter is evaluated from the calculated value of breakage energy and represented by an index on the basis that the conventional tire is 100. The larger the index value, the better the belt durability. The results of the test B are also shown in Tables 1 and 2, respectively.

As seen from the results of Tables 1 and 2, the tires of Examples 1–8 are considerably excellent in the belt durability in not only the running on good road but also the running on bad road scattered with foreign matters as compared with the conventional tires and do not cause the cord breakage, from which it is clear that the tires of Examples 1–8 have the belt durability sufficiently durable to reuse as a recapped tire and excellent resistance to shock burst and resistance to cut burst. On the other hand, the tires of Comparative Examples 1–3 show a relatively good result on the belt durability in the running on good road as compared with the conventional tires, but the belt durability on bad road is poor because the cord breakage is caused and the breakage energy is low.

As mentioned above, according to the invention, there can be provided long-life pneumatic radial tires inclusive of tires having a small aspect ratio which have a belt durability sufficient to separation at belt end and are adaptable to repetitive recapping after use to provide a belt durability sufficiently durable to reuse as a recapped tire and develop excellent resistance to cut burst and resistance to shock burst.

What is claimed is:

1. A recapped pneumatic radial tire comprising; a pair of bead portions, a pair of sidewall portions, a tread portion extending between both sidewall portions, said tread portion having tread rubber, said tread rubber comprising exclusively that part of said radial tire that is recapped, a carcass of one or more rubberized cord plies of radial cord arrangement extending between a pair of bead cores embedded in the bead portions to reinforce the bead portions, sidewall portions and tread portions, and a belt reinforcing the tread portion on an outer circumference of the carcass, said belt having at least two rubberized steel wire element layers, in which an outermost belt layer is an outermost slant element layer containing the steel wire elements obliquely arranged with respect to an equatorial plane of the tire; at least one belt layer of the belt being located inward from the outermost slant element in a radial direction of the tire and being a circumferential element layer containing the steel wire elements arranged substantially in parallel to the equatorial plane; a coating rubber for the steel wire elements in the outermost slant element layer has a modulus of elastically of compression of not less than 200 kgf/cm²; and a sum of the cross-sectional area of the steel wire elements in the at least one circumferential element layer per unit length measured in a direction perpendicular to the extension of the steel wire elements in each of the belt layers is larger than a sum of the cross-sectional area of the steel wire elements in the outermost slant element layer per the same unit length, wherein the sum of the cross-sectional area is defined by: n×a×Z×N in mm² where n is the number of steel filaments, a is the cross-sectional area of one steel filament, Z is the number of steel wire elements per unit length and N is the number of layers.

2. A pneumatic radial tire according to claim 1, wherein the sum of sectional area of the steel wire elements in the at least one circumferential element layer is not less than 2 times the sum of sectional area of the steel wire elements in the outermost slant element layer.

3. A pneumatic radial tire according to claim 1, wherein each steel wire element in the circumferential element layer has an initial elongation within a range of 1–5% prior to vulcanization and an initial elongation within a range of 0.2–3.0% after vulcanization.

4. A pneumatic radial tire according to claim 1, wherein the at least one circumferential element layer steel wire elements are arranged in the form of a wave having an amplitude in a widthwise direction of the belt.

5. A pneumatic radial tire according to claim 1, wherein each steel wire element in the outermost slant element layer has an inclination angle of 35–55° with respect to the equatorial plane of the tire.

6. A pneumatic radial tire according to claim 1, wherein an inner slant element layer containing steel wire elements obliquely arranged with respect to the equatorial plane is disposed between the carcass and the innermost layer among the circumferential element layers.

7. A pneumatic radial tire according to claim 6, wherein the inner slant element layer has a width exceeding a width of the at least one circumferential element layer.

8. A pneumatic radial tire according to claim 6, wherein each steel wire element in the inner slant element layer has an inclination angle of 10–70° with respect to the equatorial plane.

9. A pneumatic radial tire according to claim 6, wherein each steel wire element of the outermost slant element layer and each steel wire element of the inner slant element layer are crossed with each other with respect to the equatorial plane of the tire.

10. A pneumatic radial tire according to claim 6, wherein an end portion of the inner slant element layer are folded so as to enclose all of the circumferential element layers from one of widthwise ends thereof toward the other widthwise end to form a folded layer portion serving as the outermost slant element layer.

11. A pneumatic radial tire according to claim 6, wherein both end portions of the inner slant element layer are folded so as to envelop all of the circumferential element layers from both widthwise ends thereof toward the equatorial plane to form a folded layer portion serving as the outermost slant element layer.

12. The pneumatic radial tire of claim 1 wherein a width of the outermost slant element layer is larger than a width of said at least one circumferential element layer.

* * * * *